(12) United States Patent
Park et al.

(10) Patent No.: US 12,301,084 B2
(45) Date of Patent: May 13, 2025

(54) BUSBAR ASSEMBLY FOR MOTOR

(71) Applicant: LG INNOTEK CO., LTD., Seoul (KR)

(72) Inventors: Chang Hyun Park, Seoul (KR); Dong Hyun Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 251 days.

(21) Appl. No.: 17/917,024

(22) PCT Filed: Mar. 19, 2021

(86) PCT No.: PCT/KR2021/003411
§ 371 (c)(1),
(2) Date: Oct. 5, 2022

(87) PCT Pub. No.: WO2021/206308
PCT Pub. Date: Oct. 14, 2021

(65) Prior Publication Data
US 2023/0155439 A1    May 18, 2023

(30) Foreign Application Priority Data

Apr. 6, 2020 (KR) ........................ 10-2020-0041736

(51) Int. Cl.
*H02K 3/50* (2006.01)

(52) U.S. Cl.
CPC ........... *H02K 3/50* (2013.01); *H02K 2203/09* (2013.01)

(58) Field of Classification Search
CPC .. H02K 1/14; H02K 1/16; H02K 1/18; H02K 1/185; H02K 1/2706; H02K 3/04;
(Continued)

(56) References Cited

U.S. PATENT DOCUMENTS

2003/0094879 A1* 5/2003 Kobayashi ......... H02K 15/0062
                                                      310/238
2012/0286605 A1* 11/2012 Miyachi ................. H02K 5/225
                                                       310/71
(Continued)

FOREIGN PATENT DOCUMENTS

CN        106998013 A   *  8/2017   ............. H01B 9/028
KR        10-1048757 B1     8/2011
(Continued)

OTHER PUBLICATIONS

17917024_2024-8-2024_CN_106998013_A_H.pdf (Year: 2024).*
(Continued)

*Primary Examiner* — Christopher M Koehler
*Assistant Examiner* — Ahmed F Seck
(74) *Attorney, Agent, or Firm* — Birch, Stewart, Kolasch & Birch, LLP

(57) ABSTRACT

The present invention may provide a motor including a housing, a stator disposed in the housing, a rotor disposed in the stator, a busbar disposed on the stator, a plate disposed on the busbar, and a terminal part including a body part in contact with the plate and a protruding part protruding from the body part and disposed on the plate, wherein a part of the body part is disposed between the housing and the plate in a radial direction.

8 Claims, 11 Drawing Sheets

(58) Field of Classification Search
CPC .. H02K 3/12; H02K 3/28; H02K 3/32; H02K 3/34; H02K 3/38; H02K 3/50; H02K 3/505; H02K 3/522; H02K 5/04; H02K 5/15; H02K 5/225; H02K 5/161; H02K 5/16; H02K 5/10; H02K 5/1732; H02K 2203/03; H02K 2203/09; H02K 15/0093; H02K 15/0414; H02K 15/02; H02K 15/08; H02K 15/14; H02K 15/0062; H02K 15/0068; H02K 7/083; H02K 13/00; H02K 2213/03
USPC ............ 310/238, 156.38, 71, 216.092, 68 B; 264/272.14; 29/596; 417/415
See application file for complete search history.

(56) References Cited

U.S. PATENT DOCUMENTS

| | | | |
|---|---|---|---|
| 2013/0069457 A1 | 3/2013 | Kim | |
| 2014/0125169 A1 | 5/2014 | Jang | |
| 2015/0188377 A1* | 7/2015 | Kim | H02K 15/0068 310/156.38 |
| 2015/0357877 A1 | 12/2015 | Bessho et al. | |
| 2015/0357888 A1* | 12/2015 | Houzumi | H02K 15/0062 264/272 |
| 2016/0149454 A1* | 5/2016 | Asahi | H02K 3/28 |
| 2016/0218578 A1* | 7/2016 | Yamada | H02K 3/28 |
| 2017/0077653 A1* | 3/2017 | Kang | H02K 5/225 |
| 2017/0126085 A1* | 5/2017 | Kim | H02K 3/522 |
| 2017/0133905 A1* | 5/2017 | Nakamura | H02K 3/28 |
| 2018/0019544 A1* | 1/2018 | Ishibashi | H02K 5/22 |
| 2018/0123414 A1* | 5/2018 | Kim | H02K 3/18 |
| 2018/0175570 A1* | 6/2018 | Houzumi | H02K 3/28 |
| 2018/0262080 A1* | 9/2018 | Kim | H02K 5/15 |
| 2019/0077440 A1* | 3/2019 | Yamashita | B62D 5/07 |
| 2019/0165650 A1* | 5/2019 | Park | F16H 1/16 |
| 2019/0229577 A1* | 7/2019 | Sambuichi | H02K 3/50 |
| 2020/0052545 A1* | 2/2020 | Park | H02K 3/34 |
| 2021/0344251 A1* | 11/2021 | Jung | H02K 5/225 |
| 2022/0368064 A1* | 11/2022 | Gnabah | H02K 5/225 |

FOREIGN PATENT DOCUMENTS

| | | | | |
|---|---|---|---|---|
| KR | 10-2013-0061283 A | 6/2013 | | |
| KR | 10-2017-0011144 A | 2/2017 | | |
| KR | 10-2017-0050928 A | 5/2017 | | |
| WO | WO2019054090 A1 * | 3/2019 | | B62D 5/0409 |
| WO | WO 2019/082665 A1 | 5/2019 | | |
| WO | WO-2019082411 A1 * | 5/2019 | | H02K 3/38 |

OTHER PUBLICATIONS

17917024_2024-07-25_WO_2019082411_A1_H.pdf (Year: 2024).*
17917024_2024-08-04_WO_2019054090_A1_H.pdf (Year: 2024).*
17917024_2024-08-04_WO_2019082411_A1_H.pdf (Year: 2024).*

* cited by examiner

[FIG. 1]
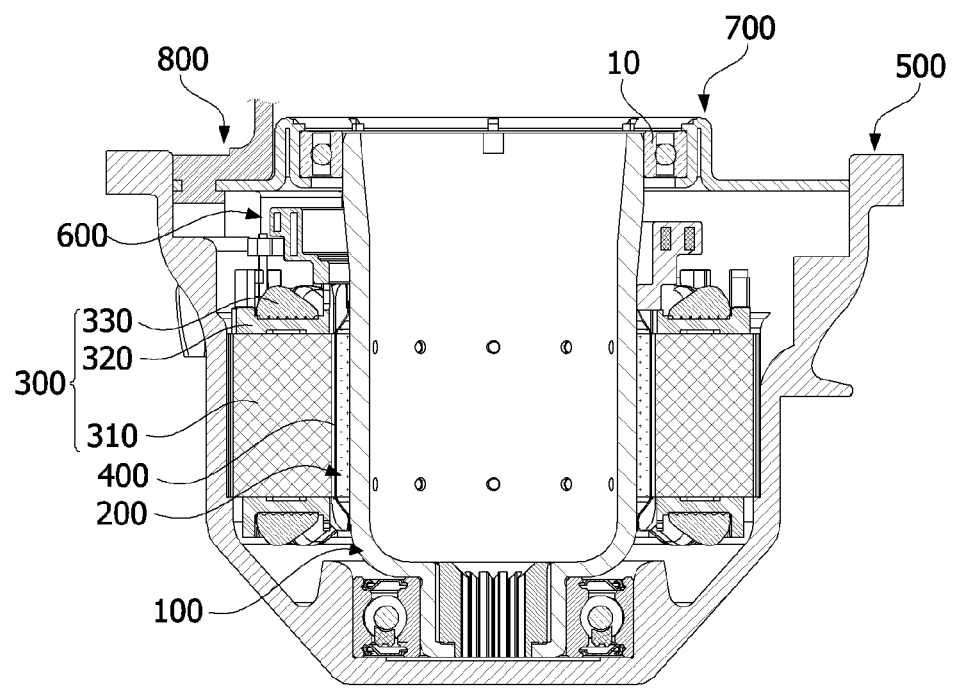

[FIG. 2]
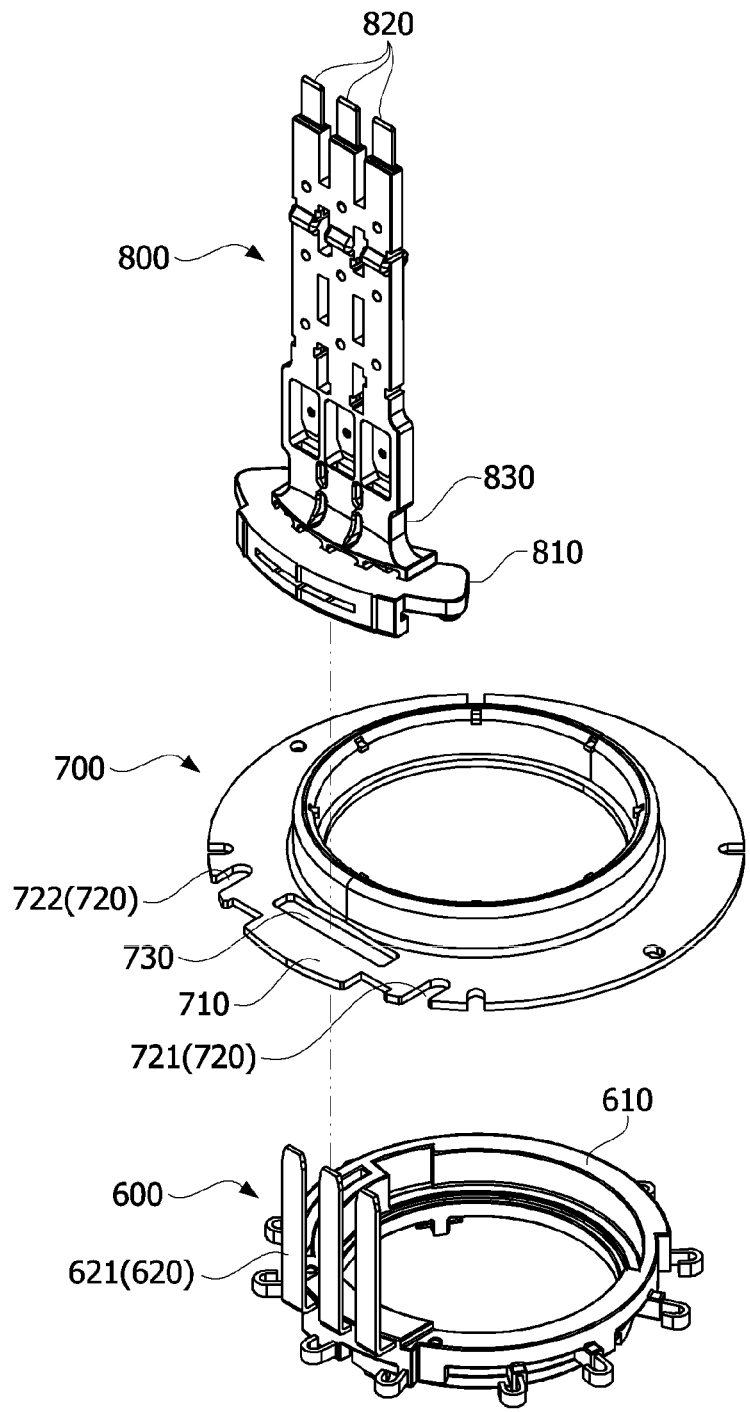

[FIG. 3]
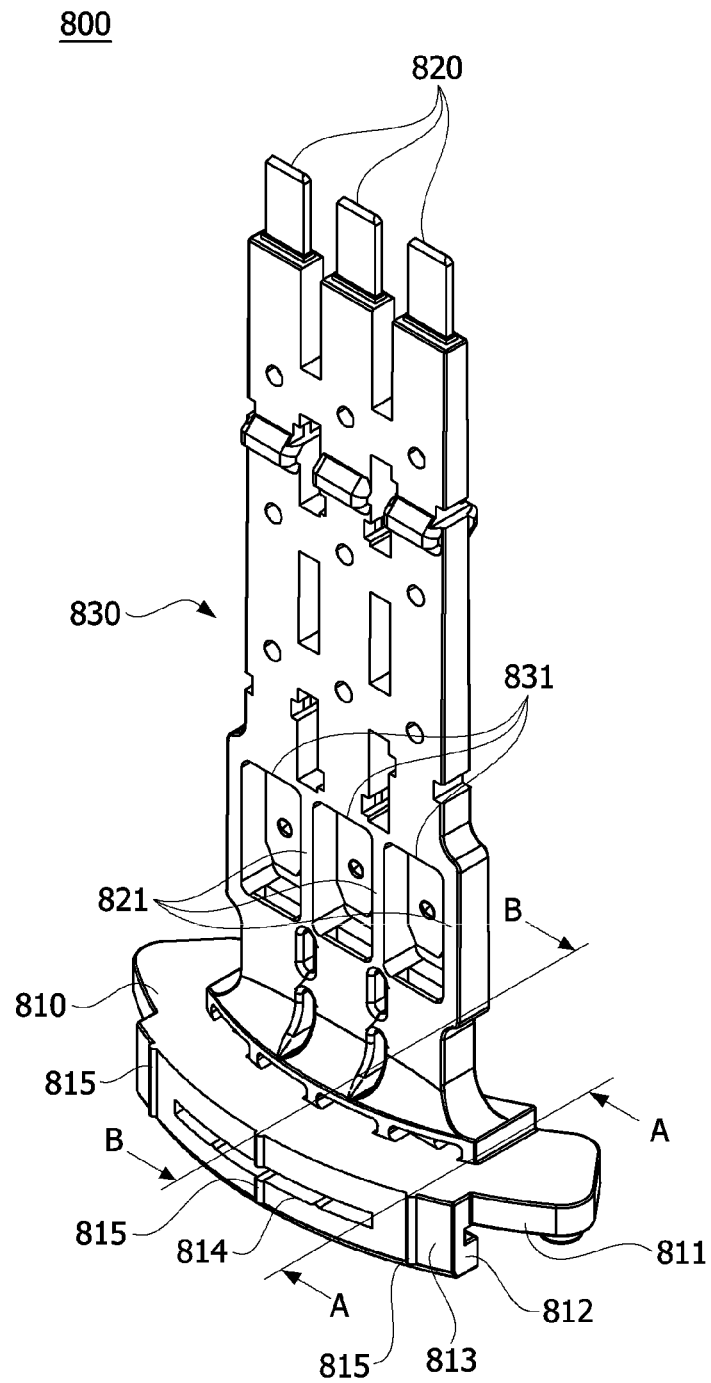

[FIG. 4]
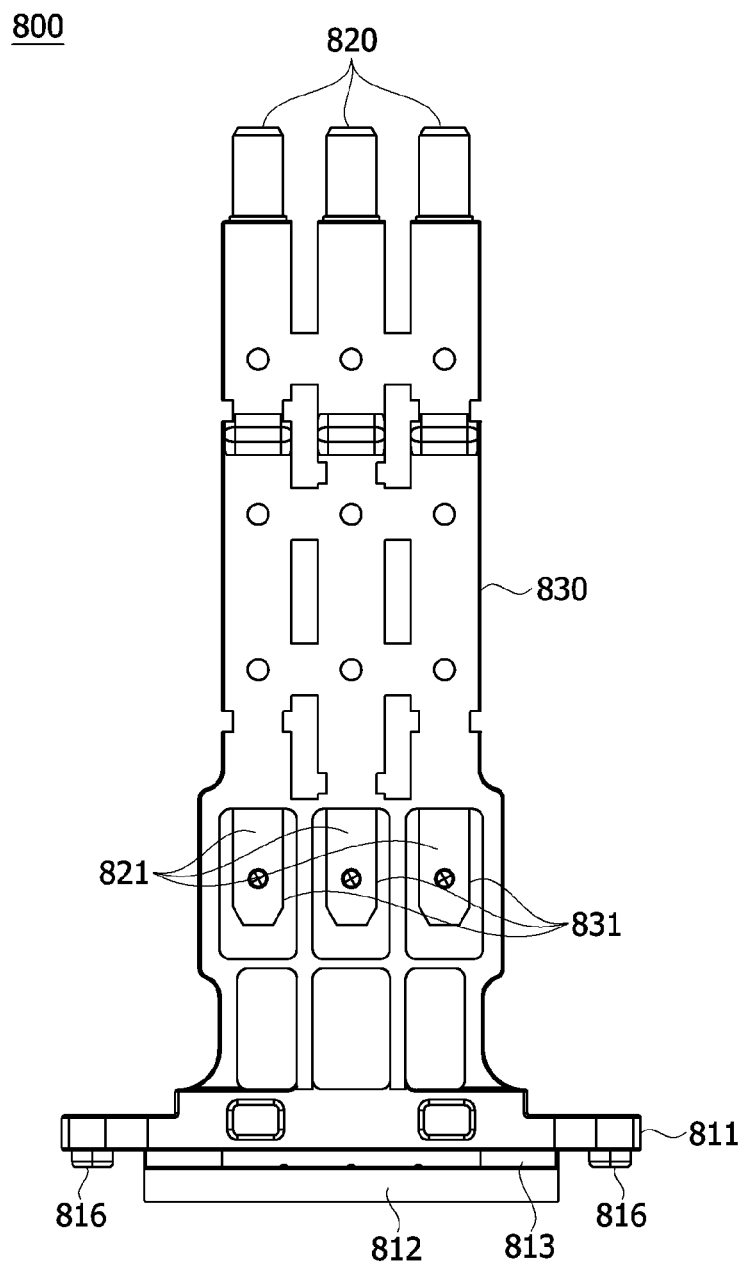

[FIG. 5]
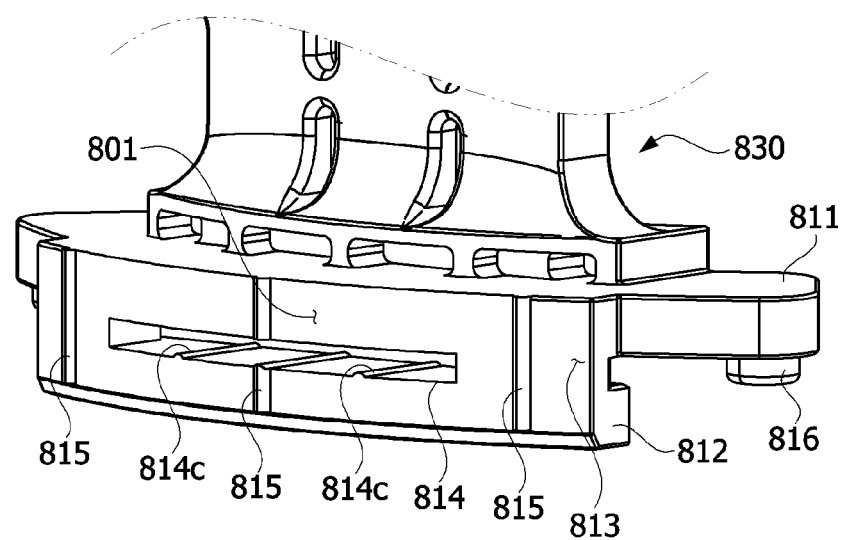

[FIG. 6]
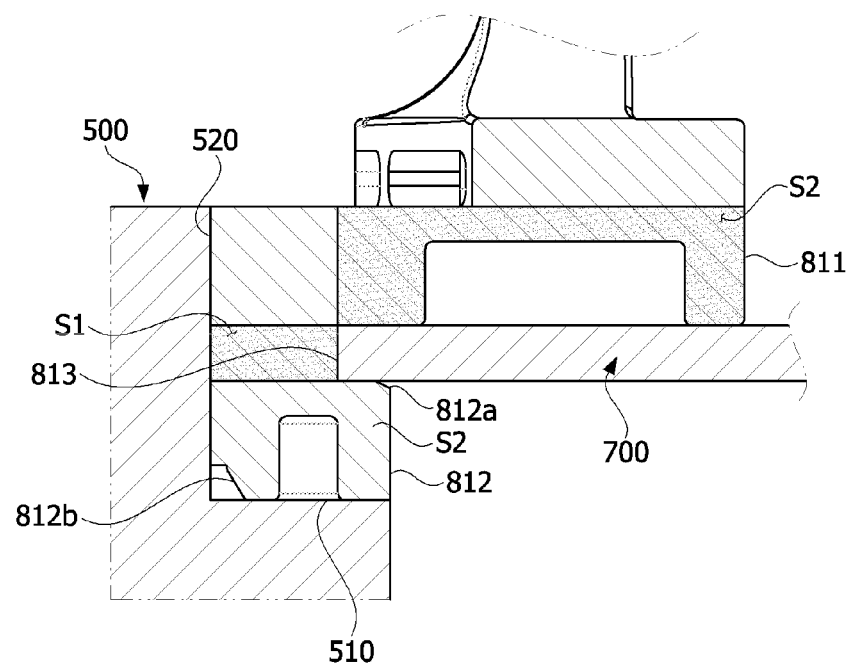

[FIG. 7]
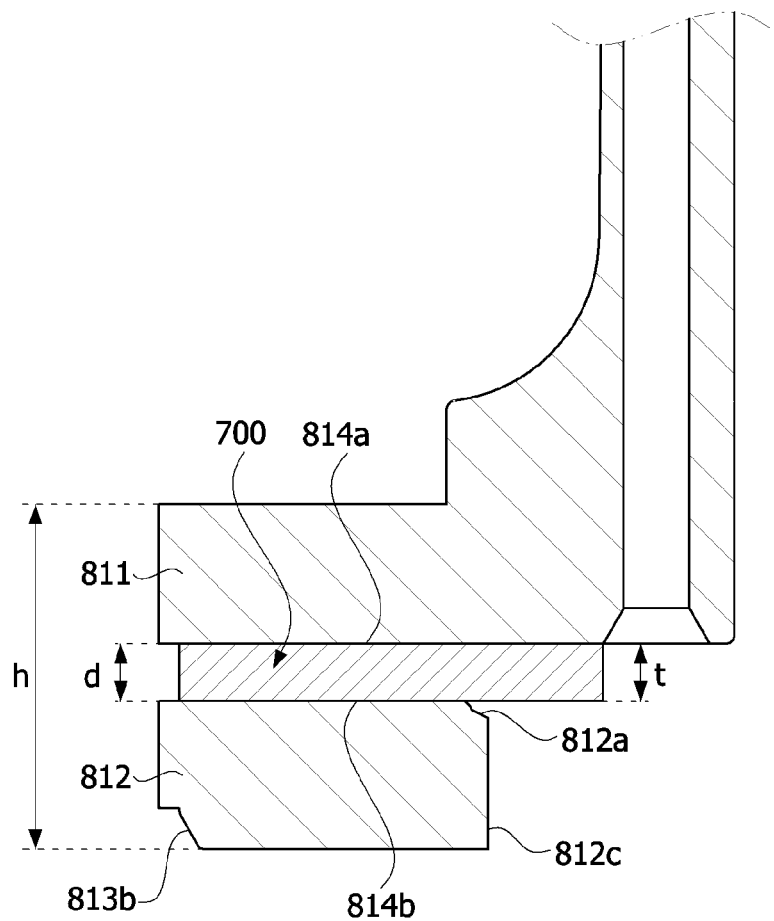

[FIG. 8]
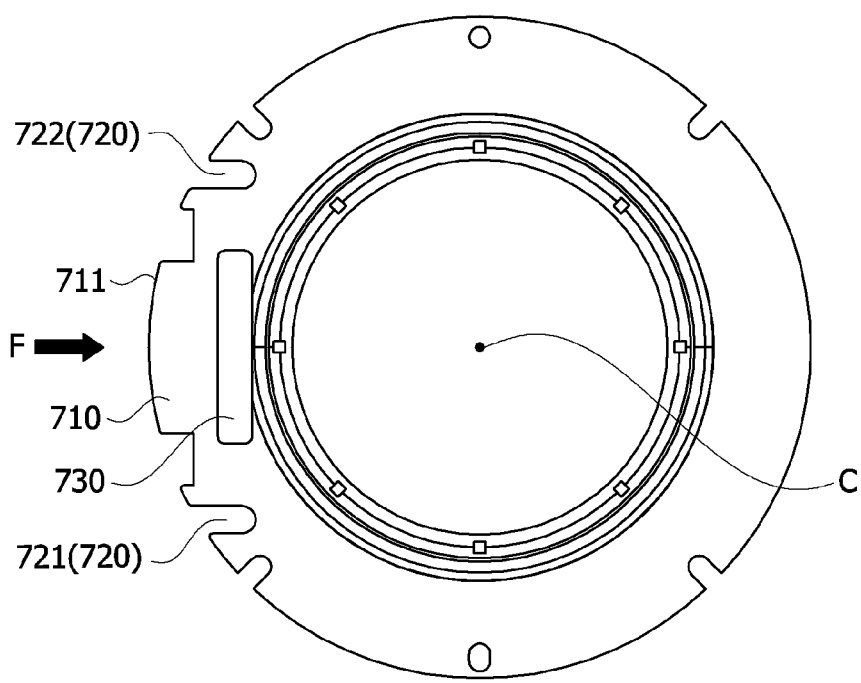

[FIG. 9]
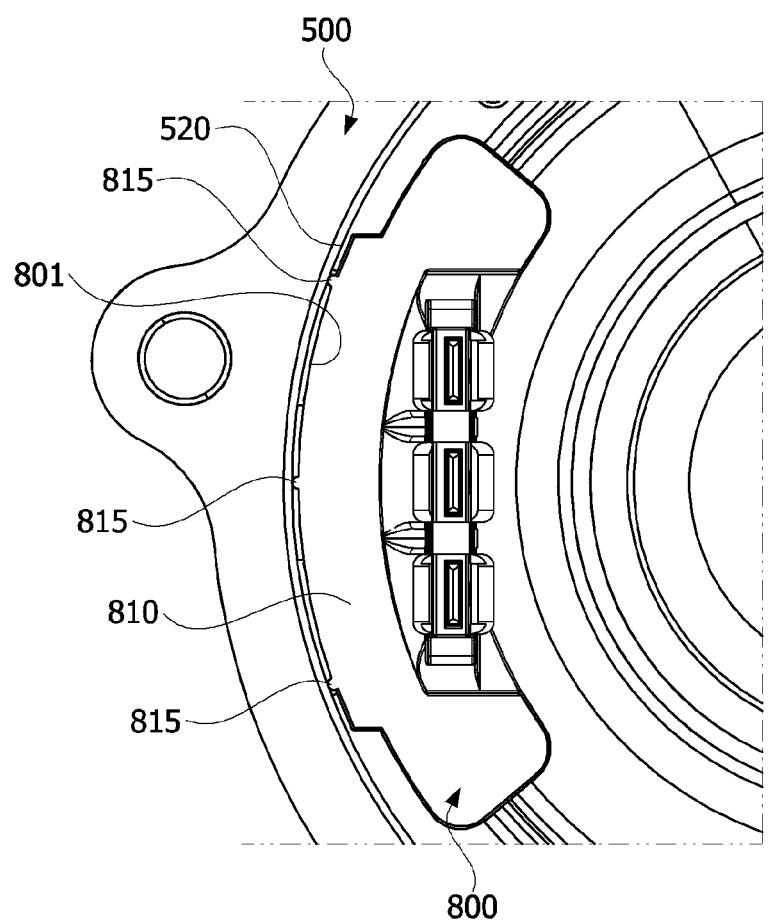

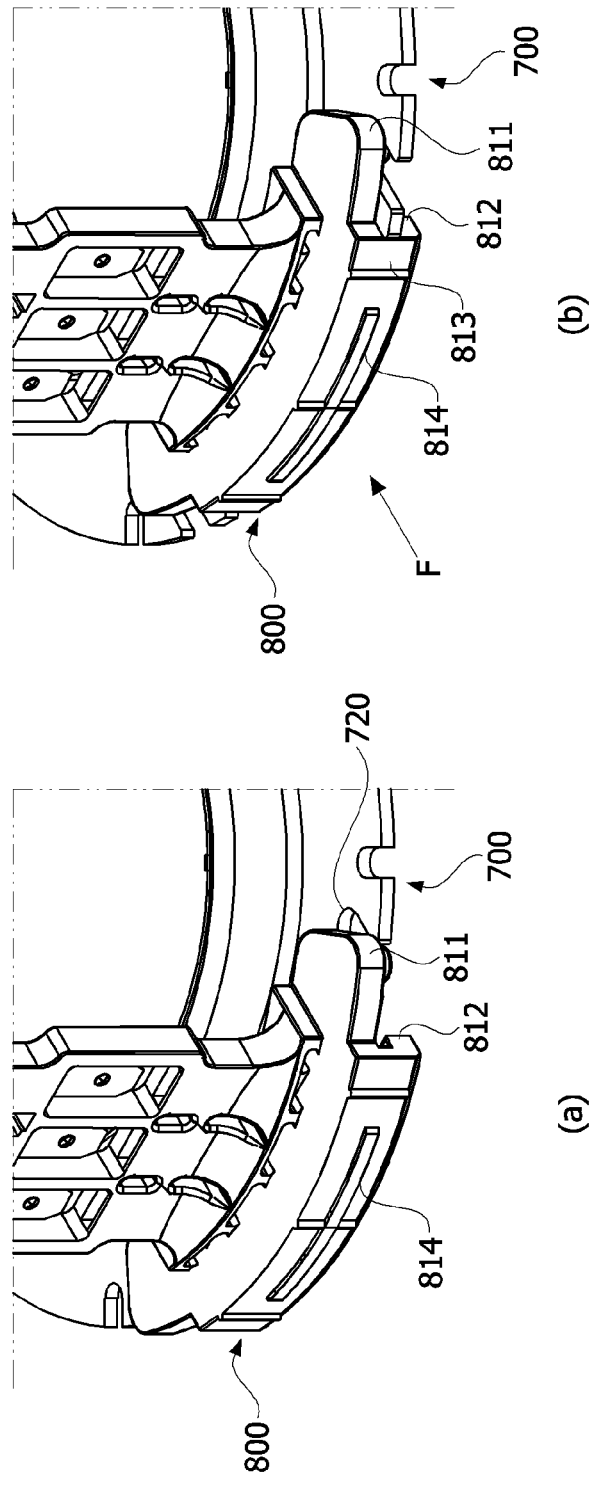
[FIG. 10]

[FIG. 11]
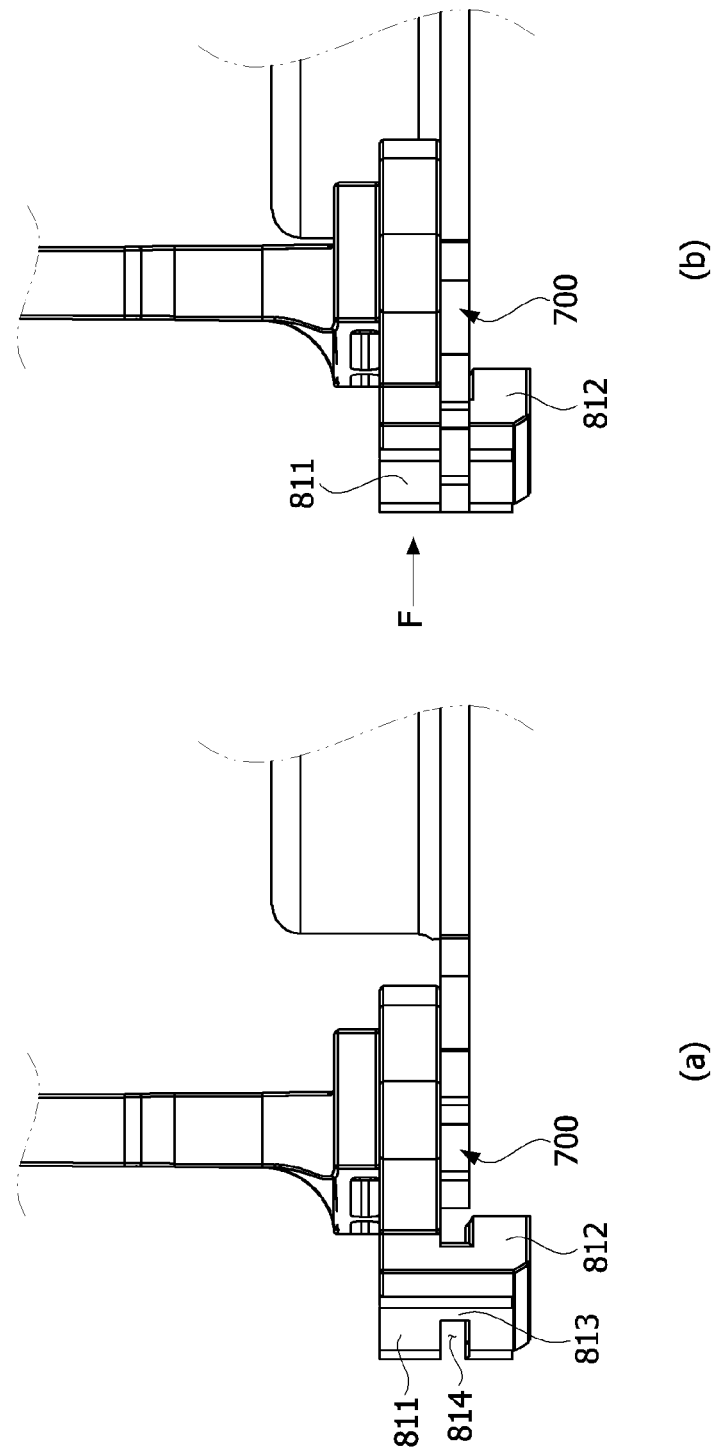

BUSBAR ASSEMBLY FOR MOTOR

CROSS REFERENCE TO RELATED APPLICATIONS

This application is the National Phase of PCT/KR2021/003411 filed on Mar. 19, 2021, which claims priority under 35 U.S.C. § 119 (a) to Patent Application No. 10-2020-0041736 filed in the Republic of Korea on Apr. 6, 2020, all of which are hereby expressly incorporated by reference into the present application.

TECHNICAL FIELD

An embodiment relates to a motor.

BACKGROUND ART

A motor may include a rotor, a stator, a housing, and a plate. The rotor and the stator are included in the housing. The housing is a cylindrical member of which an upper portion is open. The plate covers the open upper portion of the housing. A busbar may be disposed on the stator. A terminal of the busbar may be connected to a coil wound around the stator, and the terminal of the busbar may be connected to a terminal part extending in an axial direction. The terminal part is connected to an external power source.

Since the terminal part extends in the axial direction, coupling between a mold of the terminal part and the plate may be degraded. In order to improve the coupling, a protruding portion of the terminal part passing through the plate may be ultrasonically welded to be coupled to the plate.

However, the ultrasonic welding of the protruding portion has a problem of a difficulty in managing the welding portion. In addition, there are problems that the ultrasonic welding process is complex, the terminal part is shaken during the welding process, and thus a position of the terminal part is deviated.

Technical Problem

Accordingly, an embodiment is intended to solve the above problems and directed to providing a motor in which a terminal part is easily assembled.

Objectives to be achieved by the present invention are not limited to the above-described objective, and other objectives which are not described above will be clearly understood by those skilled in the art through the following descriptions.

Technical Solution

One aspect of the present invention provides a motor including a housing, a stator disposed in the housing, a rotor disposed in the stator, a busbar disposed on the stator, a plate disposed on the busbar, and a terminal part including a body part in contact with the plate and a protruding part protruding from the body part and disposed on the plate, wherein a part of the body part is disposed between the housing and the plate in a radial direction.

Another aspect of the present invention provides a motor including a housing, a stator disposed in the housing, a rotor disposed in the stator, a busbar disposed on the stator, a plate disposed on the busbar, and a terminal part including a body part in contact with the plate and a protruding part protruding from the body part and protruding upward from the plate, wherein the body part includes a first region in which the body part overlaps the plate in a radial direction and a second region in which the body part overlaps the plate in an axial direction, and the first region is disposed outside the plate in the radial direction.

Still another aspect of the present invention provides a motor including a housing, a stator disposed in the housing, a rotor disposed in the stator, a busbar disposed on the stator, a plate disposed on the busbar, and a terminal part including a body part in contact with the plate and a protruding part protruding from the body part and protruding upward from the plate, wherein the body part includes a first body disposed on the plate, a second body disposed under the plate, and a third body connecting the first body and the second body, and the third body is disposed outside the plate.

The body part may include a first hole which passes from an outer side to an inner side of the body part in a first direction, and the plate may include a first protrusion which protrudes from an edge of the plate and is disposed in the first hole.

The body part may include a second protrusion protruding in an axial direction, the plate may include a second hole which is disposed to have a length greater than a width and at which the second protrusion is positioned, and a longitudinal direction of the second hole may be parallel to the first direction.

The body part may include a first surface which is disposed to face an inner circumferential surface of the housing and in which the second hole is disposed.

The body part may include a plurality of first ribs which protrude from the first surface in a radial direction and are in contact with the inner circumferential surface of the housing.

The first hole may include a second surface and a third surface which are disposed to face each other in an axial direction, a distance between the second surface and the third surface in the axial direction may be greater than a thickness of the plate and smaller than a height of the body part, and at least one of a boundary between the second surface and an inner surface of the body part and a boundary between the third surface and the inner surface of the body part may include a first inclined surface.

The body part may include a second rib which protrudes from at least any one of the second surface and the third surface and is in contact with the plate.

The terminal part may include a power terminal connected to a busbar terminal of the busbar, the plate may include a third hole disposed to correspond to a position of the power terminal, and the first protrusion may be disposed to overlap the third hole in the first direction.

Advantageous Effects

According to an embodiment, there is an advantage that a terminal part can be easily assembled with a plate without performing an ultrasonic welding process or without using a separate fastening member.

According to the embodiment, there is an advantage of reducing deformation or generation of foreign substances in an assembly process of the terminal part.

DESCRIPTION OF DRAWINGS

FIG. 1 is a view illustrating a motor according to an embodiment.

FIG. 2 is a view illustrating a busbar, a plate, and a terminal part before coupling.

FIG. 3 is a perspective view of the terminal part.

FIG. 4 is a front view of the terminal part.

FIG. 5 is a view illustrating a body part of the terminal part.

FIG. 6 is a side cross-sectional view illustrating a state in which the terminal part and the plate are mounted on a housing, taken along line A-A of FIG. 3.

FIG. 7 is a side cross-sectional view illustrating the state in which the terminal part and the plate are mounted on the housing, taken along line B-B of FIG. 3.

FIG. 8 is a view illustrating the plate.

FIG. 9 is a view illustrating a state in which a first rib is in contact with an inner surface of the housing in a state in which the terminal part is mounted on the housing.

FIG. 10 is a set of perspective views illustrating a state in which the terminal part is assembled with the plate.

FIG. 11 is a set of side views illustrating the state in which the terminal part is assembled with the plate.

MODES OF THE INVENTION

A direction parallel to a longitudinal direction (vertical direction) of a shaft will be referred to as an axial direction, a direction perpendicular to the axial direction about the shaft will be referred to as a radial direction, and a direction along a circumference of a circle having a radius in the radial direction about the shaft will be referred to as a circumferential direction.

FIG. 1 is a view illustrating a motor according to an embodiment.

Referring to FIG. 1, the motor according to the embodiment may include a rotor 100, a magnet 200, a stator 300, a cover 400, a housing 500, a busbar 600, a plate 700, and a terminal part 800. Hereinafter, the term "inward" refers to a direction toward the rotor 200 in the radial direction of the motor, and the term "outward" refers to a direction opposite to "inward."

The rotor 100 may be a hollow member of which one side is open. Two ends of the rotor 100 may be rotatably supported by bearings in the axial direction. The rotor 100 may be disposed so that portions having different outer diameters are divided in the axial direction.

The magnet 200 may be disposed on an outer circumferential surface of the rotor 100.

The stator 300 is disposed outside the magnet 200. The stator 300 may include a stator core 310, an insulator 320 mounted on the stator core 310, and coils 330 wound around the insulator 320. The coils 330 generate a magnetic field. The stator core 310 may be a single member or a combination of a plurality of divided cores. In addition, the stator core 310 may be formed in the form in which a plurality of thin steel plates are stacked on each other but is not necessarily limited thereto. For example, the stator core 310 may also be formed as one single part.

The cover 400 fixes the magnet 200 to the rotor 100. The cover 400 surrounds partial regions of the magnet 200 and the rotor 100. The cover 400 may be a mold member formed in an over molding manner or a can member or adhesive member surrounding the magnet.

The housing 500 may be disposed outside the stator 300. The housing 500 may be a cylindrical member of which an upper portion is open. The rotor 100, the magnet 200, the stator 300, and the cover 400 are accommodated in the housing 500. In addition, the housing 500 may accommodate the bearings supporting the rotor 100.

The busbar 600 is disposed on the stator 300. The busbar 600 connects the coils 330 wound around the stator 300.

The plate 700 is disposed on the busbar 600. Bearings 10 are accommodated inside the plate 700.

The terminal part 800 is disposed on the plate 700.

FIG. 2 is a view illustrating the busbar 600, the plate 700, and the terminal part 800 before coupling.

Referring to FIGS. 2 and 3, the busbar 600 may be disposed under the plate 700. The busbar 600 may include a busbar body 610 and busbar terminals 620. The busbar body 610 may be an annular mold member. The busbar terminals 620 may be connected to end portions of the coils 330. In addition, first terminals 621 of the busbar terminals 620 are in contact with the terminal part 800. The first terminals 621 are disposed to extend upward. Three first terminals 621 may be respectively connected to U-phase, V-phase, and W-phase power sources.

The plate 700 is disposed on the busbar 600. The plate 700 may be an annular member. The bearing supporting the rotor 100 may be disposed inside the plate 700.

The terminal part 800 may include a body part 810, power terminals 820, and a protruding part 830.

The body part 810 is fixed to the plate 700 and the housing 500.

The power terminals 820 are connected to an external power source or terminals of a housing cover connected to an external power source. The power terminals 820 are fixed to the protruding part 830. Second terminals 821 of the power terminals 820 are in contact with the first terminals 621 of the busbar 600.

The protruding part 830 surrounds the power terminals 820. The protruding part 830 protrudes from the body part 810 and is disposed on the plate 700. The protruding part 830 is disposed to extend so that the power terminals 820 are connected to the external power source or the terminals of the housing cover connected to the external power source.

The terminal part 800 is a unit separate from the busbar 600.

FIG. 3 is a perspective view of the terminal part, and FIG. 4 is a front view of the terminal part.

Referring to FIGS. 2 to 4, the protruding part 830 protrudes from the body part 810. The protruding part 830 serves to support the power terminals 820 disposed to extend in a longitudinal direction and guide the power terminals 820 to the external power source or the terminals of the housing cover connected to the external power source.

A part of each of the power terminals 820 is exposed from a front end of the protruding part 830. In addition, the protruding part 830 includes openings 831. The openings 831 are for exposing the second power terminals 821 of the power terminals 820 to the outside for fusing. In the state in which the power terminals 820 are fixed to the plate 700, when the plate 700 is fixed to the housing 500, the first power terminals 621 of the busbar 600 and the second power terminals 821 of the terminal part 800 are disposed to overlap so as to be in surface contact with each other in the openings 831.

FIG. 5 is a view illustrating the body part 810 of the terminal part 800.

Referring to FIG. 5, the body part 810 is fixed to the housing 500 and the plate 700 and structurally supports the power terminals 820 disposed on the protruding part 830 together with the protruding part 830. The body part 810 may include a first body 811, a second body 812, and a third body 813.

The first body 811 is positioned on the plate 700. The protruding part 830 protrudes from the first body 811. The second body 812 is positioned under the plate 700. The third body 813 connects the first body 811 and the second body 812. The third body 813 may be provided as a plurality of third bodies 813. The plurality of third bodies 813 may be disposed apart from each other. A first hole 814 passing through inner and outer sides of the body part 810 may be disposed between the third bodies 813. The first hole 814 is a hole into which a first protrusion 710 of the plate 700 is inserted.

A first rib 815 may be disposed on a first surface 801 of the body part 810 to protrude in the radial direction. The first surface 801 is a surface facing an inner circumferential surface of the housing 500. The first rib 815 are portions in contact with an inner surface 520 of the housing 500 in a process of mounting the terminal part 800 on the housing 500. The first rib 815 may be disposed to extend in the axial direction. In addition, the first rib 815 may be disposed as a plurality of first ribs. For example, some of the plurality of first ribs 815 may be disposed at one side of the first hole 814, and others may be disposed at the other side of the first hole 814. In addition, some of the plurality of first ribs 815 may be disposed to cross the first hole 814. A second rib 814c may be disposed to protrude from an inner surface of the body part 810 in which the first hole 814 is formed. The second rib 814c is in contact with the first protrusion 710 of the plate 700 inserted into the first hole 814.

The body part 810 may include a second protrusion 816. The second protrusion 816 may protrude from a lower surface of the first body 811 in the axial direction. The second protrusion 816 is for guiding an assembly direction of the terminal part 800 in a process of assembling the terminal part 800 with the plate 700.

FIG. 6 is a side cross-sectional view illustrating a state in which the terminal part 800 and the plate 700 are mounted on the housing 500, taken along line A-A of FIG. 3.

Referring to FIGS. 5 and 6, after the terminal part 800 is assembled with the plate 700, the terminal part 800 and the plate 700 may be mounted on the housing 500. The terminal part 800 and the plate 700 may be mechanically coupled without performing an ultrasonic welding process or without using a separate fastening member In the axial direction, a space between the lower surface of the first body 811 and an upper surface of the second body 812 is formed like a slot, and the terminal part 800 and the plate 700 may be mechanically assembled in a form in which a part of the plate 700 is inserted into the space. In addition, in a state in which the terminal part 800 is coupled to the plate 700, the terminal part 800 is mounted on a step 510 disposed on the inner surface 520 of the housing 500 to be additionally coupled to the housing 500. Accordingly, a part of the body part 810 is disposed between the housing 500 and the plate 700 in the radial direction.

The body part 810 includes a first region S1 that overlaps the plate 700 in the radial direction and a second region S2 that overlaps the plate 700 in the axial direction. The first region S1 is disposed in the third body 813 and disposed outside the plate 700. The second region S2 is disposed in the first body 811 and the second body 812, and disposed at upper and lower sides from the plate 700 on the basis of the plate 700. The third body 813 may be in contact with the inner surface 520 of the housing 500. The second body 812 may be disposed under the plate 700 and in contact with the step 510 of the housing 500.

FIG. 7 is a side cross-sectional view illustrating the state in which the terminal part 800 and the plate 700 are mounted on the housing 500, taken along line B-B of FIG. 3.

Referring to FIG. 7, when the plate 700 is assembled with the terminal part 800, the first protrusion 710 of the plate 700 is disposed in the first hole 814 of the body part 810. The first hole 814 may include a second surface 814a and a third surface 814b disposed to face each other in the axial direction. A distance d between the second surface 814a and the third surface 814b in the axial direction may be greater than a thickness t of the plate 700 and smaller than a height h of the body part 810.

A first inclined surface 812a may be disposed on at least one of a boundary between the second surface 814a and the inner surface 520 of the body part 810 and a boundary between the third surface 814b and the inner surface 520 of the body part 810. The first inclined surface 812a expands an entrance of the first hole 814 to guide the first protrusion 710 of the plate 700 to be easily slid and inserted into the first hole 814.

A second inclined surface 813b may also be disposed at a corner around a boundary of a lower surface and an outer surface of the body part 810. The second inclined surface 813b serves to reduce interference between the body part 810 and the housing 500 when the terminal part 800 is mounted on the housing 500 in a state in which the terminal part 800 is fixed to the plate 700.

FIG. 8 is a view illustrating the plate 700.

Referring to FIG. 8, the plate 700 may include the first protrusion 710, a second hole 720, and a third hole 730.

The first protrusion 710 protrudes outward from an edge of the plate 700 in a first direction F. In this case, the first direction F is a direction in which the terminal part 800 slides to be assembled with the plate 700. The first hole 814 of the body part 810 is also formed in the first direction F to correspond to the protruding direction of the first protrusion 710. An edge 711 of the first protrusion 710 may have a curved surface. In this case, a curvature center of the edge 711 of the first protrusion 710 may be the same as a center C of the plate 700.

The second hole 720 is a hole which passes through the plate 700 in the axial direction and in which the first protrusion 710 of the plate 700 is disposed. While the body part 810 is inserted into the plate 700, the second protrusion 816 moves along the second hole 720 to guide movement of the body part 810. The second hole 720 may be concavely formed inward from the edge of the plate 700.

The second hole 720 is also disposed in the first direction F. The second hole 720 may be disposed as a plurality of second holes 720. For example, the second holes 720 may include a 2-1 hole 721 and a 2-2 hole 722, the 2-1 hole 721 may be disposed at one side of the first protrusion 710, and the 2-2 hole 722 may be disposed at the other side of the second protrusion 816. Each of a longitudinal direction of the 2-1 hole 721 and a longitudinal direction of the 2-2 hole 722 is a direction parallel to the first direction F.

The third hole 730 is a hole which passes through the plate 700 in the axial direction and through which the busbar terminal 620 of the busbar 600 passes. When the terminal part 800 is assembled with the plate 700, a position of the third hole 730 corresponds to a position of the power terminal 820 of the terminal part 800. The first protrusion 710 may be disposed to overlap the third hole 730 in the first direction F.

FIG. 9 is a view illustrating a state in which the first rib 815 is in contact with the inner surface 520 of the housing 500 in a state in which the terminal part 800 is mounted on the housing 500.

Referring to FIG. 9, when the terminal part 800 is mounted on the housing 500, the first rib 815 is in contact with the inner surface 520 of the housing 500. When the first surface 801 of the body part 810 is in direct contact with the inner surface 520 of the housing 500, a gap is generated between the body part 810 and the inner surface 520 of the housing 500, and thus there is a risk that the terminal part 800 is moved or separated, but when the plurality of first ribs 815 are in contact with the inner surface 520 of the housing 500, the movement of the terminal part 800 is prevented.

FIG. 10 is a set of perspective views illustrating a state in which the terminal part 800 is assembled with the plate 700, and FIG. 11 is a set of side views illustrating the state in which the terminal part 800 is assembled with the plate 700.

FIGS. 10A and 11A are views illustrating the terminal part 800 and the plate 700 before assembly is performed and showing a state in which the first hole 814 of the terminal part 800 is aligned with the first protrusion 710 of the plate 700. FIGS. 10B and 11B are views illustrating a state in which the terminal part 800 is pushed and fixed to the plate 700 in the first direction F. When the terminal part 800 is pushed in the first direction F, the first protrusion 710 is inserted into the first hole 814, and thus the terminal part 800 is coupled to the plate 700. In this case, the first protrusion 710 of the plate 700 moves along the first hole 814 of the plate 700 to guide movement of the terminal part 800. When the first protrusion 710 is inserted into the first hole 814, the first protrusion 710 is in contact with the second rib 814c. Accordingly, movement of the plate 700 which may occur between the first hole 814 and the first protrusion 710 may be reduced when compared to a state in which the first protrusion 710 is in direct contact with the second surface 814a or the third surface 814b.

As described above, since the terminal part 800 is pushed from the outside to the inside of the plate 700 in the radial direction to assemble the terminal part 800 and the plate 700, there is an advantage that an assembly process is very simply and quickly performed. In addition, since the first body 811 and the second body 812 of the terminal part 800 fix the plate 700 from the upper and lower sides of the plate 700 in the axial direction, and the third body 813 of the terminal part 800 restricts the plate 700 in the radial direction at the same time, the terminal part 800 can be firmly coupled to the plate 700 without using a separate fastening member or without performing a welding process.

In addition, in a state in which the terminal part 800 is mounted on the housing 500, since the inner surface 520 of the housing 500 restricts the body part 810 of the terminal part 800 so as not to allow separation of the body part 810 of the terminal part 800 in the radial direction, and particularly, the outer surface of the body part 810 is in contact with the inner surface 520 of the housing 500, structural stability is much higher when compared to a case in which the terminal part 800 is assembled using a fastening member or through a welding process.

The above-described embodiment can be used for various devices for vehicles, home appliances, or the like.

The invention claimed is:

1. A motor comprising:
a housing;
a stator disposed in the housing;
a rotor disposed in the stator;
a busbar disposed on the stator;
a plate disposed on the busbar; and
a terminal part including a body part in contact with the plate, and a protruding part protruding from the body part and disposed on the plate,
wherein a part of the body part is disposed between the housing and the plate in a radial direction,
wherein the body part includes a first hole that passes through an outer side and an inner side of the body part in a first direction,
wherein the plate includes a first protrusion protruding from an edge of the plate and disposed in the first hole,
wherein the first hole includes a second surface and a third surface disposed to face each other in the axial direction, and
wherein the body part includes a second rib which protrudes from at least any one of the second surface and the third surface and is in contact with the plate.

2. The motor of claim 1, wherein the body part includes a first region disposed to overlap the plate in a radial direction and a second region disposed to overlap the plate in an axial direction, and
the first region is disposed outside the plate in the radial direction.

3. The motor of claim 1, wherein the body part includes a first body disposed on the plate, a second body disposed under the plate, and a third body connecting the first body and the second body, and
the third body is disposed outside the plate.

4. The motor of claim 1, wherein:
the body part includes a second protrusion protruding in the axial direction;
the plate includes a second hole which is disposed to have a length greater than a width and at which the second protrusion is positioned; and
a longitudinal direction of the second hole is parallel to the first direction.

5. The motor of claim 4, wherein the body part includes a first surface which is disposed to face an inner circumferential surface of the housing and in which the second hole is disposed.

6. The motor of claim 5, wherein the body part includes a plurality of first ribs which protrude from the first surface in the radial direction and are in contact with the inner circumferential surface of the housing.

7. The motor of claim 1,
wherein a distance between the second surface and the third surface in the axial direction is greater than a thickness of the plate and smaller than a height of the body part, and
wherein at least one of a boundary between the second surface and an inner surface of the body part and a boundary between the third surface and the inner surface of the body part includes a first inclined surface.

8. The motor of claim 1, wherein:
the terminal part includes a power terminal connected to a busbar terminal of the busbar;
the plate includes a third hole disposed to correspond to a position of the power terminal; and
the first protrusion is disposed to overlap the third hole in the first direction.

* * * * *